Oct. 21, 1969   R. W. LEISTERER   3,474,401
APPARATUS FOR IMPROVING THE RECOGNITION
OF ECHOES IN SONAR SYSTEMS
Filed Oct. 21, 1968   3 Sheets-Sheet 1

Inventor:
Reinhard Wilhelm Leisterer
By: Spencer & Kaye
Attorneys

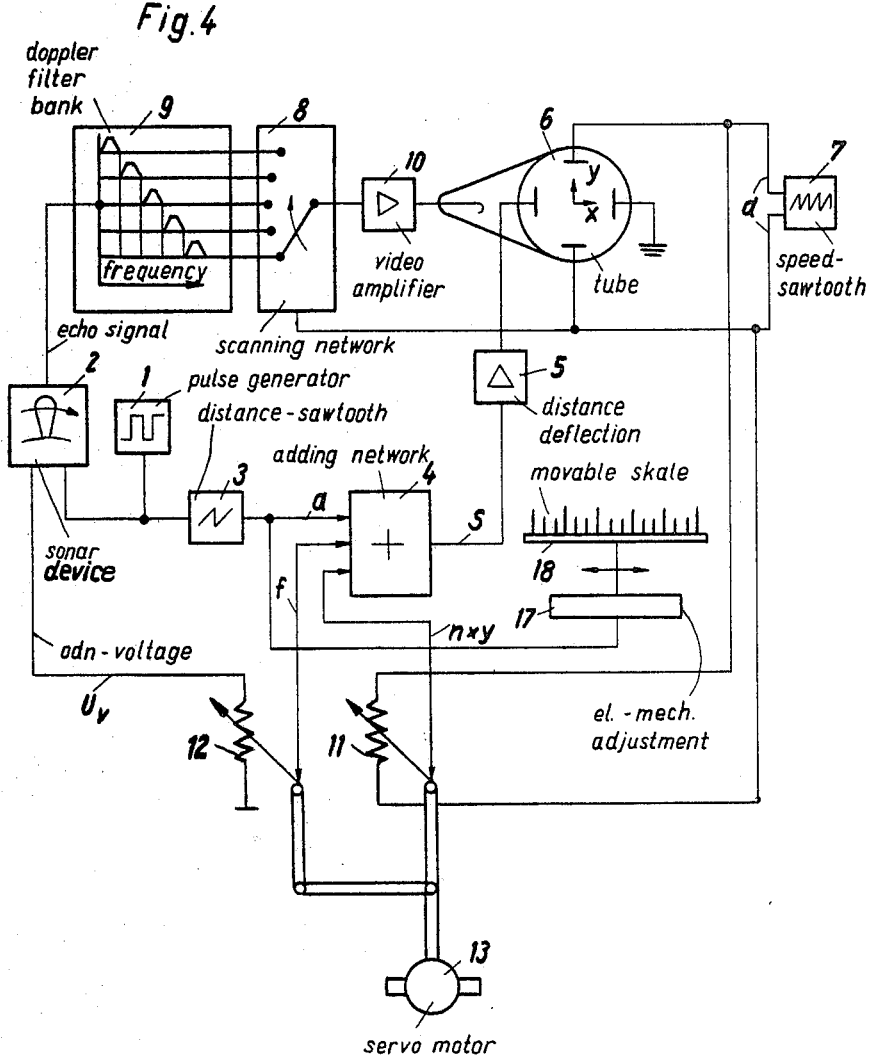

United States Patent Office 3,474,401
Patented Oct. 21, 1969

3,474,401
APPARATUS FOR IMPROVING THE RECOGNITION OF ECHOES IN SONAR SYSTEMS
Reinhard Wilhelm Leisterer, Bremen, Germany, assignor to Fried Krupp Gesellschaft mit beschrankter Haftung, Essen, Germany
Filed Oct. 21, 1968, Ser. No. 769,130
Claims priority, application Germany, Oct. 20, 1967, 1,566,854
Int. Cl. G01s 9/66
U.S. Cl. 340—3    4 Claims

ABSTRACT OF THE DISCLOSURE

Circuit apparatus for improving the target display in a sonar system. The target is indicated at a point on the screen of a cathode-ray tube, the position of which is dependent upon the distance and the relative speed between the observer and the observed target. The circuit according to the invention is effective to maintain the target display point at the same position on the screen of the cahode-ray tube for a prescribed time duration notwithstanding a change in the distance between the observer and the target.

CROSS-REFERENCE TO RELATED APPLICATION

The subject matter of this application is related to that disclosed in the co-pending application of Werner Schwarz, Reinhard W. Leisterer, Herwig Meyerhoff and Günter Berkelmann, filed Aug. 5, 1968.

BACKGROUND OF THE INVENTION

The present invention relates to improved apparatus for obtaining information about a target from echoes in a sonar system. The sonar system is of the type which displays the target information on a cathode-ray tube screen. The distance of the target from the observer is indicated on the abscissa and the speed of the target relative to the observer is indicaed on the ordinate of the screen. The brightness of the spot on the screen is a measure of the intensity of the echo.

Sonar systems of the type having a combined indication of the distance and speed of a target, relative to the observer, are known in the art. The German Patent No. 1,135,344 describes a system of this type in which these values are indicated in polar coordinates on a common screen. In this system, the angle represents the distance and the magnitude of the radius indicates the relative speed between the observer and the target.

Sonar receiver circuits providing this basic type of indication are also known which employ the Doppler effect to determine the speed of the target. These circuits indicate the frequency of the incoming echo signal—that is, the speed information—on the ordinate of a cathode-ray tube screen and indicate the echo travel time—that is, the distance information—on the abscissa.

Since, in general, the targets from which the echoes of a sonar system return have a movement of their own, the echo frequency will be proportional to the approximate relative velocity $$v_r = -\frac{dr}{dt}$$

while the echo travel time will be proportional to the distance $r$.

Assuming that the vessel carrying the sonar system is stationary, the distance of the targets which are shown in the $x$-axis of the cathode-ray tube screen will not change since such targets produce no Doppler shift; that is, their closure speed is zero. The targets shown above the $x$-axis will move with increasing time from right to left, corresponding to a positive Doppler shift or positive closure speed. The targets which lie below the $x$-axis will correspondingly move from left to right.

FIGURE 1 is a graph illustrating a cathode-ray tube screen of a sonar system of this type. The images of four echo soundings in the presence of three targets are indicated on the screen. Target A moves in the direction toward the sonar-system-carrying vessel; target B is stationary and target C moves away.

In order to indicate clearly that the distance $r$ of a target echo of a particular sounding is approximately proportional to the Doppler shift (to the ordinate value), the echoes of the first sonding at time $t_1$ are shown having the same distance $r_1$. Starting with this assumption, all three echoes will always lie on a straight line:

(1) $$r = r_1 + \frac{dr}{dt}(t-t_1)$$

As is shown in FIGURE 1, the prior art sonar systems with combined distance and Doppler indication in rectangular coordinates on a cathode-ray tube screen display the echoes of a moving target as a succession of separated or isolated dots. This type of display has a disadvantage, however. Since the light spots of the individual display points lie so far apart that they overlap not at all, they do not permit an integration of the brightness of the display as is otherwise possible when the information is viewed on an afterglow display tube.

It is already known in the radar art to improve the recognition of target echoes by repeating the successive echoes of a target and displaying them at the same point on a cathode-ray tube screen which exhibits a long afterglow ("image-to-image correlation").

SUMMARY OF THE INVENTION

It is an object of the present invention, therefore, to provide means for improving the target display of a sonar system of the type which indicates the distance and the relative speed between the observed target and the observer in rectangular coordinates on a cathode-ray tube screen.

More particularly, it is an object of the present invention to display the echoes received from a target, during a prescribed time duration, at the same point on the cathode-ray tube screen. This means, in the example illustrated in FIGURE 1, that all the echo signals $A_1$ to $A_4$ be displayed at points $A_1$ and $C_1$, respectively.

These objects, as well as other objects which will become apparent in the discussion that follows, are achieved, according to the present invention, utilizing the principle described above for improving the recognition of radar echoes, by providing means for adding a fractional part of the target speed sweep voltage to the target distance sweep voltage. If the resulting voltage is then used to deflect the electron beam of the cathode-ray tube in the direction of the ordinate of the screen, the target echoes will be displayed at the same point on the screen, assuming the component of the speed of the observing vessel in the direction of the sonar soundings is zero.

The above apparatus, according to the present invention, can also be made operative to display the target echoes at the same point on the cathode-ray tube screen independently of the speed or velocity of the vessel making the sonar soundings if a time-proportional fraction of a voltage is also added to the target distance sweep voltage, which voltage is proportional to the component of the speed of the vessel in the direction of the sonar soundings.

BRIEF DESCRIPTION OF THE DRAWINGS

FIGURE 4 is a block diagram of a circuit, according to a preferred embodiment of the present invention, which compensates for the migration of the target display as it is illustrated in FIGURE 1.

DESCRIPTION OF THE PREFERRED EMBODIMENTS

Figure 1:
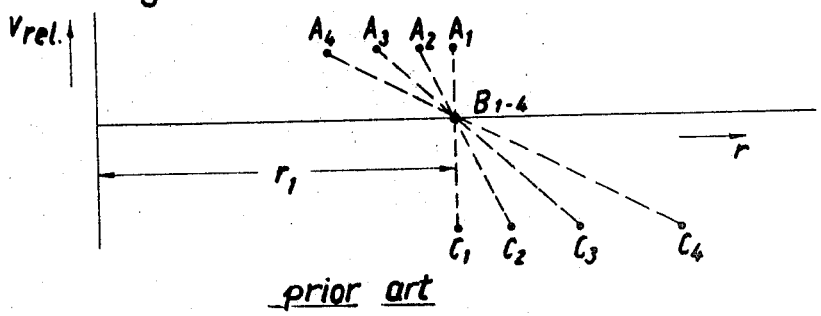
FIGURE 1 is a graph showing the typical display of echo information in a sonar system of the type to which the present invention relates.

As has been noted above, FIGURE 1 illustrates the display of a conventional sonar system which employs the Doppler effect to determine the relative velocity of the target. The echo images of successive soundings appear in the form $A_1$, $A_2$, $A_3$, $A_4$ for an approaching target and in the form $C_1$, $C_2$, $C_3$, $C_4$ for a receding target whereas for a stationary target all echo images appear at a single point B on the $x$-axis.

In the apparatus known in the prior art, the electron beam is guided across the screen to correspond to the distance (that is, to the echo travel time) from the left to the right so that the abscissa will take the value:

(2) $$x = a \cdot t \quad (0 \leq x \leq b)$$

where $a$ is the proportionality factor for the distance and $b$ the width of the screen image. The beam is simultaneously periodically and rapidly deflected from the bottom to the top, according to a second linear time function, so that the ordinate will have the value:

(3) $$y = d \cdot t \left(-\frac{h}{2} \leq y \leq \frac{h}{2}\right)$$

where $d$ is the proportionality factor for the Doppler shift and $h$ the height of the screen image.

The first function is the distance sweep, and the second the Doppler sweep.

Since $d \gg a$, the cathode-ray tube beam passes over the screen to form a raster consisting of a plurality of almost vertical lines. When the brightness of the screen is correctly adjusted, however, these lines do not become visible as it is intended to have only the target points appear luminous. Proportional to the $y$-deflection of the electron beam the outputs of a bank of Doppler filters are scanned via electronic switches. Such a bank of filters, which consists of a plurality of parallel narrow-band, bandpass filters, is already in use in the prior art apparatus mentioned above. A suitable scanner, which, for example, includes controlled field effect transistors operated as switches, is described in the application of Schwarz et al., referred to at the beginning of this specification.

Figure 2A:
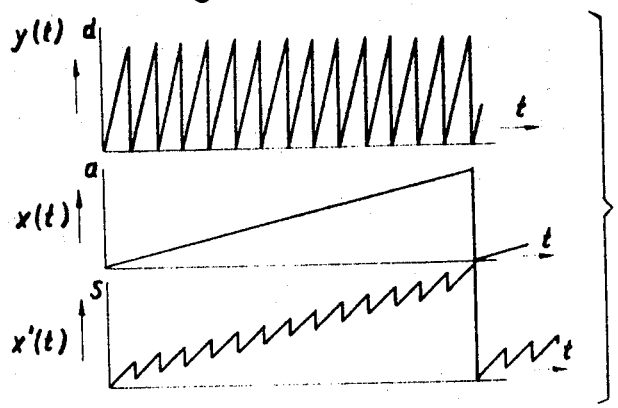
FIGURE 2a is a graph of the Doppler sweep voltage, the distance sweep voltage and the resulting sweep voltage which may be used for the $x$-axis deflection. This sweep voltage does not make allowance for the movement of the observer.

If now, as shown in FIGURE 2a, a portion $n \cdot y$ of the Doppler sweep is superimposed on the distance sweep $a$, a slanted or tilted raster will be written on the screen instead of the vertical one, producing the resulting shift $s$.

If this slanted pattern were to be described again by Cartesian coordinates $x'$ and $y'$, these coordinates will be given by:

(4) $$x' = x + ny$$

(5) $$y' = y$$

Since $x$ is proportional to the distance (6) $$x = e \cdot r$$

where $e$ is the distance scale factor, and since $y$ is proportional to the closure speed (7) $$y = -f \cdot \frac{dr}{dt}$$

where $f$ is the target speed scale factor, it follows that (8) $$x' = e \cdot r - nf \frac{dr}{dt}$$

When compared with the Equation 1 rewritten as follows (9) $$er_1 = er - e(t - t_1) \cdot \frac{dr}{dt}$$

it may be seen that the successive target echoes may be written at the same abscissa $x'$ if

(10) $$n \cdot f = +e(t - t_1)$$

that is, if

(11) $$n = +\frac{e}{f}(t - t_1)$$

is varied in proportion to the elapsed time.

Since experience has shown that the target-created-Doppler shift will vary considerably slower, in the majority of cases, than the target distance, a vertical deviation of the target image on the screen display of the cathode-ray tube will hardly ever occur. Even without employing the compensation measures for the $y$-axis of the type employed for the $x$-axis, a regulation of the sweep voltages according to the above equations will assure that successive target echoes will be written at the same point on the screen for a longer period of time.

EXAMPLE

Distance scale factor:

12 cm. $\hat{=}$ 6000 m.

$$e = \frac{12}{6 \cdot 10^5} = 2 \cdot 10^{-5}$$

Doppler scale factor:

16 cm. $\hat{=}$ 40 m./sec.

$$f = \frac{16}{4 \cdot 10^3} = 4 \cdot 10^{-3} \text{ sec.}$$

Echo sequence: 8 seconds.

At the time $t - t_1 = 0$ seconds the target is assumed to be at a distance of $r = 3000$ m.

It is also assumed to be approaching the vessel carrying the sonar system at a speed of $dr/dt = -10$ m./sec.

If this is the case, the conventional Doppler shift sonar equipment will display echo signals of consecutive soundings at the following coordinates:

| $t-t_1$ (sec.) | x (cm.) | y (cm.) |
|---|---|---|
| −16 | 6.32 | 4 |
| −8 | 6.16 | 4 |
| 0 | 6 | 4 |
| 8 | 5.84 | 4 |
| 16 | 5.68 | 4 |

According to the present invention, a portion $$n = \frac{2 \cdot 10^{-5}}{4 \cdot 10^{-3}}(t - t_1)$$

of the Doppler sweep must be superimposed upon (added to) the distance sweep. The following table shows the portions $n$ with the resulting $x$-displacement of the target echo $n \cdot y$.

| $t-t_1$ (sec.) | $n$ | $n \cdot y$ (cm.) |
|---|---|---|
| −16 | −8·10⁻² | −0.32 |
| −4 | −4·10⁻² | −0.16 |
| 0 | 0 | 0 |
| +8 | +4·10⁻² | +0.16 |
| +16 | +8·10⁻² | +0.32 |

Figure 3:
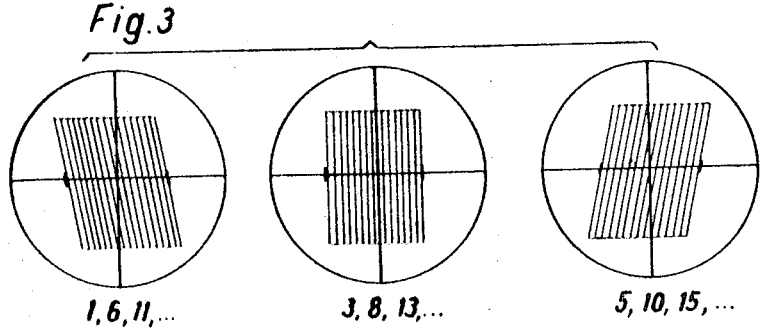
FIGURE 3 is a diagram showing three samples of the raster appearing on the cathode-ray tube screen when the $x$-axis deflection of the electron beam is controlled by the voltage of the type shown in FIGURE 2b.

This produces, for 5 soundings, at first a raster which is inclined toward the left by 5°, then a vertical raster and finally a raster inclined 5° to the right, as shown in FIGURE 3. As can be easily ascertained from a comparison of the two tables, the technique according to the present invention allows the target echo to be written at the same point for all 5 soundings, i.e. at $x=6$ cm., $y=4$ cm.

In practice, a time-proportional control of the raster inclination will not be continued indefinitely. Rather, periodically, for example after each 5 soundings, the raster will be reset at the inclination to the left (at the 6th, 11th, etc., sounding, per FIGURE 3).

In the example described above and illustrated in FIGURE 2a, it has been assumed that the sonar carrying vessel—i.e., the "observer"—is stationary. If, however, the observer moves, the echo signals originating from a stationary target B will move on the display screen illustrated in FIGURE 1.

Compensation is provided for this movement of the observer, according to a preferred embodiment of the present invention, by superimposing an additional slow sweep $f$ upon the target distance sweep. The slow sweep voltage is increased in proportion to the component of velocity of the observer in the direction of observation; that is, in proportion to the Doppler shift produced by the motion of the observing vessel itself. This technique thus eliminates the component of velocity due to the motion of the observer from stationary as well as from moving targets.

Figure 2B:
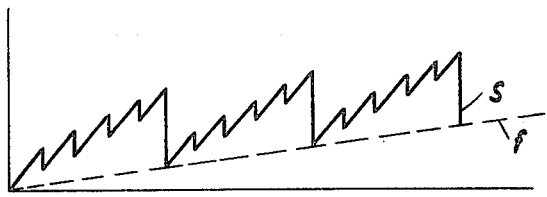
FIGURE 2b is a graph of the resulting sweep voltage, for $x$-axis deflection, which makes allowance for the movement of the observer.

This additional slow sweep prevents the resulting sweep voltage $s$ from returning to zero at the termination of each target distance sweep $a$ as shown in FIGURE 2a. Rather, each new distance sweep $a$ is made to start at an incrementally increased initial value, per FIGURE 2b, until the slow sweep $f$ has terminated. The use of this new composite sweep voltage shown in FIGURE 2b prevents the targets displayed on the cathode-ray tube screen from wandering in spite of any movement of the observing vessel itself.

The correction afforded by the slow sweep voltage $f$ is also repeated periodically so that when the sonar soundings are taken in the forward direction from a moving vessel, the beam of the cathode-ray tube will be deflected in correspondence with the line raster of FIGURE 3; that is, the raster on the left for each first, sixth, eleventh, etc. sounding; the raster in the center of FIGURE 3 for each third, eighth, thirteenth, etc. sounding, and the raster on the right for each fifth, tenth, fifteenth, etc. sounding.

The apparatus for generating the resulting sweep voltages described above—that is, for superimposing a time-proportional fraction of the Doppler sweep voltage $d$ and a time-proportional and an observer-speed-proportional sweep voltage $f$ on the distance sweep voltage $a$—is illustrated in FIGURE 4.

The apparatus includes an astable multivibrator 1 which serves as a time base. It determines the sounding or echo sequence of the sonar device 2 and triggers the sawtooth generator 3 at the moment that a sonar sounding pulse is sent. The output voltage of the sawtooth generator 3 then begins to increase linearly with time to provide the target distance sweep $a$.

A second sawtooth generator 7 produces a target Doppler shift sweep voltage $d$ at a higher frequency than the distance sweep voltage $a$ (frequency of the pulse generator 1). This speed-determining sweep is applied directly to deflect the beam of the cathode-ray tube 6 in the direction of the ordinate, or $y$-axis, of the tube screen. During each voltage rise of the Doppler sweep $d$—that is, each time the beam traverses the $y$-axis—the outputs of the Doppler filter bank 9 are scanned by a scanning network 8 in synchronism with the $y$-deflection. The required proportionality between the $y$-axis deflection and the scanned output of the Doppler filter bank 9 is effected by controlling the scanning network 8 (which, as has been noted above, may advantageously be constructed using controlled field effect transistors) by the Doppler sweep voltage $d$ itself. The filter bank 9 consists of a group of parallel-connected, narrow-band, bandpass filters, each of which is tuned to a different frequency. This filter bank, which is described in further detail in the co-pending application referred to at the beginning of this specification, is operative to analyze the frequency of the echo signal received by the sonar device 2 and to produce a working voltage at only the output of that bandpass filter the range of which covers the frequency of the received echo signal. This output is then scanned by the scanning network 8 and employed to control a video amplifier 10. The ordinate position of the luminous target spot on the screen of the cathode-ray tube 6 is thus made a measure of the echo frequency; that is, when compared to the frequency of the sonar signal which was sent, a measure of the Doppler shift and therefore the relative speed between the observer and the target.

The portion of FIGURE 4 which has been described above represents the state of the art in a sonar system Doppler shift display to which the present invention has been applied. According to the invention, apparatus is provided to obtain a fraction $n$ of the sawtooth voltage of the target speed sweep $d$ and to add this fraction to the voltage of the target distance sweep $a$. The resulting sum signal $s$ is then passed through a deflection amplifier 5 and used to deflect the electron beam of the cathode-ray tube 6 in the direction of the abscissa, or $x$-axis, of the cathode-ray tube screen.

As shown in FIGURE 4, the apparatus for obtaining the fraction $n$ of the sawtooth voltage $d$ may be realized by a potentiometer 11. Proper control of the potentiometer 11 will thus ensure that the electron beam will describe a path on the screen of the cathode-ray tube which corresponds to the slanted line raster of FIGURE 3. The output of the potentiometer 11, as well as the output of the distance sawtooth generator 3 is applied to an adding network 4.

An additional feature of the present invention contemplates a displacement of the raster on the screen of the cathode-ray tube by an amount proportional to the component of velocity of the vessel carrying the sonar system in the direction in which the sonar soundings are made. This feature is realized by providing an additional sawtooth voltage, the slow sweep $f$, which is also applied to the adding network 4 and added to the target distance sweep voltage $a$. This slow sweep $f$ is obtained, in the illustrated embodiment, from a potentiometer 12. The potentiometer 12 is supplied by a direct voltage $U_v$ which is proportional to the component of velocity of the sonar system carrying vessel in the echo sounding direction. This voltage $U_v$ is available in sonar systems having "Own-Doppler-Nullification" (ODN); see, for example, "Principles and Applications of Underwater Sound," a Government Research Report, PB 161,682, Summary Technical Report of Division 6, NDRC: vol. 7. 1946, chapter 11.

The taps of the potentiometers 11 and 12 are adjusted in a time-proportional manner by a servo-motor 13 and periodically returned to their initial position in a considerably shorter time. The adjustment of the taps of the potentiometer by a value corresponding to the length of the previous sounding period.

Figure 5:
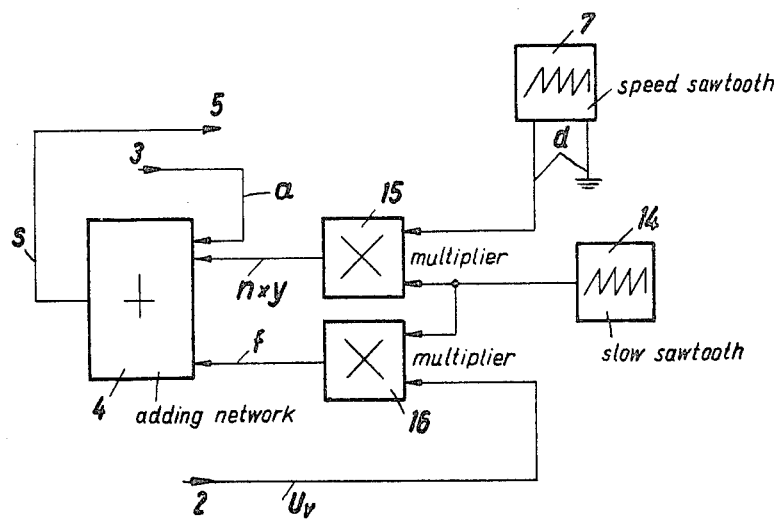
FIGURE 5 is a block diagram of a modification of the circuit of FIGURE 4.

In place of the mechanical adjusting elements—the potentiometers 11 and 12 and the motor 13—of the circuit of FIGURE 4, it is also possible to employ purely electronic means to realize the apparatus according to the present invention. Such an embodiment is illustrated in FIGURE 5. The two potentiometers with their drive, the motor 13, are there replaced by a sawtooth generator 14 and two multipliers 15 and 16. The output of the sawtooth generator 14 is multiplied by the Doppler sweep voltage $d$ in the element 15 and multiplied by the ODN-voltage $U_v$ in the element 16. The resulting signals—the Doppler sweep portion $n \cdot y$ and the slow sweep $f$—are applied to the adding network 4 as is the case in FIGURE 4. It will be understood that if the output voltage of the sawtooth generator 14 corresponds in value to the position of the servo-motor 13, the embodiment of FIGURE 5 will operate in a manner identical to the embodiment illustrated in FIGURE 4.

For a better understanding of the function of the apparatus described above—and to illustrate that the compensation of the distance display amounts to a shift of the entire $x$-axis to move all the target points $A_n$ to the point $A_1$—FIGURE 4 is provided with an electromechanical adjusting device 17 which moves a distance scale 18 back and forth in front of the screen of the cathode-ray tube 6. The scale 18 is moved a distance which is proportional to the target distance sweep voltage $a$.

As described above, the apparatus according to the present invention is operative to maintain a series of target display points at the same position on the screen of the cathode-ray tube 6 for a prescribed time notwithstanding a change in the distance between the observer and the target. Thus, if the screen exhibits a suitably long afterglow or persistence, the brightness of successive display points will be integrated, permitting an accurate estimate of the size of the target.

It will be understood that the above description of the present invention is susceptible to various modifications, changes and adaptations.

What is claimed is:

1. In sonar apparatus for displaying target distance on the abscissa and relative target speed on the ordinate of a cathode-ray tube screen having a long period of afterglow, said apparatus including means for varying the brightness of the beam of the cathode ray tube in dependence upon the intensity of a sonar echo, first saw tooth generator means for producing a target distance sweep voltage and second saw tooth generator means for producing a target speed sweep voltage, the improvement comprising, in combination:

(a) third means, connected to said second saw tooth generator, for producing a voltage which is a fraction $n$ of the target speed sweep voltage;
   (b) fourth means, connected to said third means, for varying the fraction $n$ in direct proportion to the ratio of the target distance to the target velocity scale factors and to the time;
   (c) fifth means, connected to said first saw tooth generator means and to said third means, for adding said target distance sweep voltage and said voltage produced by said third means and producing a sum voltage;
   (d) sixth means for applying the target speed sweep voltage to deflect the beam of the cathode-ray tube in the direction of the ordinate of the cathode-ray tube screen; and
   (e) seventh means for applying the sum voltage to deflect the beam of the cathode-ray tube in the direction of the abscissa of the cathode-ray tube screen.

2. The apparatus defined in claim 1, wherein said fourth means includes means for periodically repeating the time-proportional variation of the fraction $n$.

3. The apparatus defined in claim 1, further comprising eighth means for producing a voltage which is proportional to the component of the speed of the sonar apparatus in the direction of the sonar soundings, and ninth means for varying the voltage produced by said eighth means in direct proportion to the time, and wherein said fifth means is also connected to said ninth means and is also operative to add the voltage produced by said ninth means to said target distance sweep voltage and said voltage produced by said third means.

4. The apparatus defined in claim 3, wherein said ninth means includes means for periodically repeating the time-proportional variation of the voltage produced by said eighth means.

References Cited

UNITED STATES PATENTS

| 3,121,856 | 2/1964 | Finney | 340—3 |
| 3,149,326 | 9/1964 | Naidich | 343—9 |

RICHARD A. FARLEY, Primary Examiner

U.S. Cl. X.R.

315—24; 343—9